UNITED STATES PATENT OFFICE.

GEORGE F. WILSON, OF EAST PROVIDENCE, AND PHILIP O'REILLY, OF PROVIDENCE, RHODE ISLAND.

GUM SUBSTITUTE.

SPECIFICATION forming part of Letters Patent No. 248,904, dated November 1, 1881.

Application filed February 27, 1879.

*To all whom it may concern:*

Be it known that we, GEORGE F. WILSON, of East Providence, and PHILIP O'REILLY, of Providence, Rhode Island, have invented a new and useful Improvement in Gum Substitutes, which improvement is fully set forth in the following specification.

The object of this invention is the production of what is known in the arts as "gum substitute," "dextrine," or "British gum," in a cheaper and better manner than that in which it has heretofore been made, and at the same time to produce a more uniform and better quality of gum. In the method heretofore pursued in the production of this article the process has been ordinarily an intermittent one. Potato-starch is placed in pans to the depth, say, of four inches, and the pans are placed on wheels and rolled into ovens with movable fronts, which are closed when the loaded pans are in place in the oven.

Heat is now applied by means of flues and continued until the roasting of the starch is completed—say in from six to twelve hours—when the fronts are removed, the pans drawn out, emptied, and again filled and replaced in the oven, and the process repeated. There are manifold objections to this method. Some portion of the starch is baked, while other parts are not even roasted. It cannot be stirred without opening the fronts of the ovens and wholly or partially running out the pans. The process is expensive, requiring a large amount of labor used in the manner indicated, and also in sorting out and separating the various qualities for combination. In like manner a continuous process of roasting in revolving cylinders, in which the starch passes through the same irregularly, and is also apt to cake and to burn, because no means are used for insuring the positive movement of the starch while roasting, and for preventing its caking and adherence to the sides of the cylinders, is for that reason objectionable. A gum substitute has also been prepared by boiling potato-starch with water acidulated with sulphuric acid and then precipitating the acid with lime or other earthy matter, and then evaporating the amylaceous sirup to dryness. A gum substitute has, moreover, been prepared from potato-starch and water acidulated with nitric and other acids, and then roasted in iron pans in an oven, as described above. The gums prepared in this way are never entirely soluble. In treating starch with sulphuric acid more or less of the starch is changed to glucose or grape-sugar, thus reducing its adhesive and thickening qualities. The gum produced from potato-starch and nitric acid is objectionable, on account of the production of oxalic acid, a well-known poisonous article, which is destructive to colors containing metallic oxides dyed on textile fabrics and on account of its liability to find its way into family use in the preparation of sirups and jellies.

The principal commercial sources of starch are potatoes and corn or maize. Corn-starch differs from potato starch in that the granules or crystals of corn-starch are much smaller than those of potato-starch. They also differ in another and very important respect, and that is that the capsules or enveloping-sacs in which the starch is contained are widely different, viz: In the case of potato starch they are thin, weak, and easily burst asunder, while in the case of corn-starch they are tough, firm, and not easily broken. Hence in the arts in the production of British gum or "gum substitute," so called, potato-starch has been, so far as we are aware, universally employed, and for the reasons set forth above.

Corn-starch, for the purpose of experiment or research in the laboratory, may have been treated with weak solutions of acid or with acid salts; but we are not aware that even this has been done. It is certain that the manufacturers of this article have hitherto regarded it as impossible to produce British gum or gum substitute from corn-starch in such form that it would be acceptable to the larger consumers for the purposes for which such articles are adapted.

We have tried a great variety of methods for breaking the enveloping-sacks of the corn-starch, believing that if this could be done the starch, when set loose therefrom, could be as easily converted into British gum, or gum substitute, or dextrine, as that obtained from potato-starch, and that it would yield a product equally as valuable to those who use it as that obtained from potato-starch, and be at the same time more profitable for the manufacturer, because it contains a smaller quantity of the water of crystallization.

Owing to the failure of the potato-crop for some years past, the production of potato-starch has become very uncertain, both as to price and quantity, thus giving calico-printers and other consumers a great deal of annoyance and disappointment in the price of these goods, as gum substitute is an item of great importance in those arts.

By our process can be produced a gum of uniform color and quality from corn-starch that will supply all these wants.

The following description will enable those skilled in the art to carry out our process for preparing a pure gum substitute from corn-starch, soluble in cold water.

We take for each one hundred pounds of corn-starch thirty pounds of water, and dissolve in it eight ounces of commercially-pure hydrochloric acid, and use enough of this acidulated water to dampen or moisten the starch. We now thoroughly mix the acid solution and starch, and leave the mass in a heap for some time to become homogeneous. Then it is spread on screens and exposed in a suitable apartment to a current of air to dry. The drying is prolonged until the starch contains only about thirteen per cent. of water. The dried material is then bolted or sifted, in order to reduce it to a powdered condition, when it is ready for roasting by the method and means which we will now describe. The powdered starch is introduced into a casing provided with a screw-conveyer revolving inside, and provided with means for agitating the starch and to prevent packing. Heat is applied to the outside of the casing, and as the starch is gradually conveyed therethrough it is uniformly dried and roasted or browned when delivered at the opposite end. The temperature applied to the outside of the casing is regulated to the proper degree for converting starch into British gum or other gum substitutes desired.

The gum produced by this method is very much more soluble than that heretofore made. The roasting process is continuous, and apparatus of any suitable construction may be used to carry it out. Such an apparatus is made the subject of a separate application for Letters Patent filed February 20, 1879.

It is evident that potato-starch may, with or without the treatment with acid, be roasted by the method above described, and also that the corn-starch prepared with hydrochloric acid might be roasted or converted into gum by the ordinary or known methods. The combined process, as described, is, however, regarded as the best method and as producing the most uniform and best quality of gum. Various other changes might be made in the manner of carrying into effect our invention without departing from the spirit thereof.

As corn starch prepared by different manufacturers differs somewhat in being acid or alkaline, it would therefore be well to test some of the moistened starch with litmus paper, and if it gives to the latter a red color the quantity of acid to be used to each hundred pounds of corn-starch may be reduced to six ounces. On the contrary, if the starch, tested as above, should color a piece of red litmus paper blue, the quantity of acid required to convert a hundred pounds of corn-starch to a soluble gum or dextrine may be increased to ten ounces. Thus prepared and roasted, the product is a beautiful light colored dextrine. To neutralize the last trace of hydrochloric acid that may escape evaporation when in the process of roasting, we add a small quantity of a carbonated alkali. We prefer bicarbonate of soda. This will combine with the hydrochloric acid, giving a trace of neutral chloride of sodium.

In preparing this gum substitute, we do not confine ourselves to the use of hydrochloric acid, but can use chloride of zinc, or acid phosphate of lime, alone or combined with it. In using the zinc chloride the quantity to each hundred pounds of corn-starch will be eight, ten, or twelve ounces, following the rule previously laid down for using hydrochloric acid. In using the acid phosphate of lime, we follow the same rule as for hydrochloric acid, except in the quantity, which is fifteen, eighteen, or twenty-two ounces, at 16° Baumé, to each hundred pounds of starch.

Having thus described our said invention and the manner in which the same is or may be carried into effect, what we claim, and desire to secure by Letters Patent, is—

1. The process of preparing corn-starch for the production of gum by treating the same with a solution of hydrochloric acid, or its equivalent, in the proportions substantially as described, to moisten the starch without forming a solution thereof, and then drying, substantially as described.

2. The method of converting starch into gum, the same consisting in exposing the starch in a continuous stream to the action of a suitable degree of heat, the starch during such exposure being moved forward constantly and with a regulated speed, and being also agitated, whereby all parts of the starch are evenly and uniformly roasted and all caking and burning avoided, substantially as described.

3. The process of making a soluble gum from corn-starch by treating the same with hydrochloric acid or its equivalent, drying, and roasting, substantially as described.

4. The process of manufacturing soluble gum, the same consisting in treating corn or other starch with hydrochloric acid or its equivalent, drying and roasting by heating and agitating the same in a continuous stream in a suitable vessel or casing, substantially as set forth.

In testimony whereof we have signed this specification in the presence of two subscribing witnesses.

GEO. F. WILSON.
PHILIP O'REILLY.

Witnesses to signature of Geo. F. Wilson:
E. A. DICK,
C. J. HEDRICK.

Witnesses to signature of P. O'Reilly:
CHAS. A. CATLIN,
G. M. CARPENTER, Jr.